(12) United States Patent
Klimek et al.

(10) Patent No.: US 9,826,351 B2
(45) Date of Patent: *Nov. 21, 2017

(54) SYSTEM AND METHOD FOR BEACON FLEET MANAGEMENT

(71) Applicant: Estimote Polska Sp. z o. o., New York, NY (US)

(72) Inventors: Marcin Klimek, Kraków (PL); Łukasz Kostka, New York, NY (US); Jakub Krzych, New York, NY (US)

(73) Assignee: Estimote Polska Sp. z o. o., Cracow (PL)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,939

(22) Filed: May 9, 2017

(65) Prior Publication Data

US 2017/0245104 A1    Aug. 24, 2017

Related U.S. Application Data

(63) Continuation-in-part of application No. 15/466,165, filed on Mar. 1, 2017, which is a continuation of application No. 15/253,376, filed on Mar. 31, 2016, now Pat. No. 9,622,208.

(60) Provisional application No. 62/334,115, filed on May 10, 2016, provisional application No. 62/416,395, filed on Nov. 2, 2016, provisional application No. 62/213,467, filed on Sep. 2, 2015.

(51) Int. Cl.
| | |
|---|---|
| *H04W 24/00* | (2009.01) |
| *H04W 4/02* | (2009.01) |
| *H04W 4/00* | (2009.01) |
| *H04W 84/18* | (2009.01) |

(52) U.S. Cl.
CPC ............ *H04W 4/02* (2013.01); *H04W 4/001* (2013.01); *H04W 84/18* (2013.01)

(58) Field of Classification Search
CPC ....... H04W 64/00; H04W 4/02; H04W 4/008; H04W 4/021; H04W 4/001; H04W 84/18; H04W 12/06; H04W 76/021; H04W 24/00; H04W 40/24; H04W 40/244; H04W 48/16; G01S 5/0252; G01S 5/0018; G01S 5/0236; G01S 5/0284; G01S 5/0242; G08B 1/08; H04L 29/08; H04L 67/02; H04L 63/10
USPC .................... 455/456.1, 456.6, 434; 709/224
See application file for complete search history.

(56) References Cited

U.S. PATENT DOCUMENTS

| | | |
|---|---|---|
| 6,091,358 A | 7/2000 | Maniscalco et al. |
| 6,873,258 B2 | 3/2005 | Marples et al. |
| 7,027,808 B2 | 4/2006 | Wesby |
| 7,038,584 B2 * | 5/2006 | Carter .................. G01S 5/0036 340/539.13 |

(Continued)

FOREIGN PATENT DOCUMENTS

| | | | | |
|---|---|---|---|---|
| WO | WO 0221429 A3 * | 8/2002 | ......... | G06K 7/10237 |
| WO | WO 03021429 A2 * | 3/2003 | ............... | G06F 8/34 |

(Continued)

*Primary Examiner* — Mahendra Patel
(74) *Attorney, Agent, or Firm* — Jeffrey Schox; Diana Lin

(57) ABSTRACT

A method for distributed beacon management, including: broadcasting a packet from the beacon; receiving the packet at an application executing on a plurality of user devices; and transmitting beacon information extracted from the packet to the management system from the application.

16 Claims, 8 Drawing Sheets

(56) References Cited

U.S. PATENT DOCUMENTS

| | | | |
|---|---|---|---|
| 524,377 A1 | 7/2006 | Moskovitz | |
| 7,072,671 B2 | 7/2006 | Leitch | |
| 7,283,846 B2 | 10/2007 | Spriestersbach et al. | |
| 7,312,752 B2 | 12/2007 | Smith et al. | |
| 7,458,825 B2 | 12/2008 | Atsmon et al. | |
| 7,499,462 B2 | 3/2009 | MacMullan et al. | |
| 7,639,131 B2 * | 12/2009 | Mock | G01S 5/0205 340/539.11 |
| 7,705,728 B2 | 4/2010 | Mock et al. | |
| 7,835,505 B2 | 11/2010 | Toyama et al. | |
| 7,855,679 B1 | 12/2010 | Braiman | |
| 7,983,677 B2 | 7/2011 | Dacosta | |
| 8,058,988 B1 * | 11/2011 | Medina, III | G08B 21/0238 340/539.1 |
| 8,139,945 B1 * | 3/2012 | Amir | H04B 10/1149 340/8.1 |
| 8,260,320 B2 | 9/2012 | Herz | |
| 8,265,621 B2 | 9/2012 | Kopikare et al. | |
| 8,489,112 B2 | 7/2013 | Roeding et al. | |
| 8,520,648 B2 | 8/2013 | Cordeiro | |
| 8,559,975 B2 | 10/2013 | Lin et al. | |
| 8,594,850 B1 | 11/2013 | Gourlay et al. | |
| 8,612,604 B2 | 12/2013 | Beatty et al. | |
| 8,644,255 B1 | 2/2014 | Burcham et al. | |
| 8,694,060 B2 | 4/2014 | Vanderaa et al. | |
| 8,694,782 B2 | 4/2014 | Lambert | |
| 8,723,720 B2 | 5/2014 | Moffatt et al. | |
| 8,781,502 B1 | 7/2014 | Middleton et al. | |
| 8,791,901 B2 | 7/2014 | Mallinson | |
| 8,797,214 B2 | 8/2014 | Taylor et al. | |
| 8,847,754 B2 | 9/2014 | Buchheim et al. | |
| 8,867,993 B1 | 10/2014 | Perkins et al. | |
| 8,868,133 B1 | 10/2014 | Rosenbaum et al. | |
| 8,934,389 B2 | 1/2015 | Kuehnel et al. | |
| 8,938,196 B2 | 1/2015 | Bradish et al. | |
| 8,971,850 B2 | 3/2015 | Klein et al. | |
| 8,988,221 B2 | 3/2015 | Raji et al. | |
| 8,996,030 B2 | 3/2015 | Grainger et al. | |
| 9,014,715 B2 | 4/2015 | Alizadeh-Shabdiz et al. | |
| 9,033,255 B2 | 5/2015 | Tessier et al. | |
| 9,036,792 B2 | 5/2015 | Cacioppo et al. | |
| 9,063,212 B2 | 6/2015 | Jones, Jr. | |
| 9,113,309 B2 | 8/2015 | Uilecan et al. | |
| 9,113,343 B2 | 8/2015 | Moshfeghi | |
| 9,140,796 B2 | 9/2015 | Zhou | |
| 9,202,245 B2 | 12/2015 | Kostka et al. | |
| 9,258,674 B2 | 2/2016 | Chen | |
| 9,282,582 B1 | 3/2016 | Dunsbergen et al. | |
| 9,307,355 B2 | 4/2016 | Nehrenz et al. | |
| 9,351,114 B2 | 5/2016 | Chatterjee et al. | |
| 9,361,630 B1 | 6/2016 | Goswami | |
| 9,408,060 B2 | 8/2016 | Helms et al. | |
| 9,424,699 B2 * | 8/2016 | Kusens | G07C 9/00007 |
| 9,471,917 B2 | 10/2016 | Govindarajan et al. | |
| 9,474,962 B2 | 10/2016 | Barney et al. | |
| 9,558,507 B2 | 1/2017 | Zilkha | |
| 9,571,957 B2 | 2/2017 | Granbery | |
| 9,591,570 B2 | 3/2017 | Kubo et al. | |
| 9,622,046 B2 * | 4/2017 | Otis | H04W 4/043 |
| 9,622,208 B2 | 4/2017 | Mycek et al. | |
| 9,642,173 B2 | 5/2017 | Granbery | |
| 9,652,124 B2 * | 5/2017 | Cotier | G06F 3/0482 |
| 9,689,955 B2 | 6/2017 | Rosenbaum | |
| 2003/0100315 A1 | 5/2003 | Rankin | |
| 2006/0290519 A1 | 12/2006 | Boate et al. | |
| 2008/0068519 A1 | 3/2008 | Adler et al. | |
| 2008/0139306 A1 | 6/2008 | Lutnick et al. | |
| 2009/0005079 A1 * | 1/2009 | Shields | G06F 17/30241 455/456.3 |
| 2009/0131079 A1 | 5/2009 | Sekhar | |
| 2009/0327135 A1 | 12/2009 | Nguyen et al. | |
| 2010/0317371 A1 * | 12/2010 | Westerinen | H04M 1/72566 455/456.6 |
| 2011/0029359 A1 | 2/2011 | Roeding et al. | |
| 2012/0095805 A1 | 4/2012 | Ghosh et al. | |
| 2012/0172055 A1 * | 7/2012 | Edge | G01S 5/0018 455/456.1 |
| 2012/0190386 A1 | 7/2012 | Anderson | |
| 2012/0309256 A1 | 12/2012 | Theodore | |
| 2012/0316960 A1 | 12/2012 | Yang | |
| 2013/0030915 A1 | 1/2013 | Statler et al. | |
| 2013/0065584 A1 * | 3/2013 | Lyon | H04W 28/06 455/434 |
| 2013/0225197 A1 * | 8/2013 | McGregor | G01S 1/042 455/456.1 |
| 2014/0087758 A1 | 3/2014 | Maor | |
| 2014/0148196 A1 | 5/2014 | Bassan-Eskenazi et al. | |
| 2014/0149577 A1 * | 5/2014 | Monighetti | H04L 67/22 709/224 |
| 2014/0220883 A1 | 8/2014 | Emigh et al. | |
| 2014/0277654 A1 | 9/2014 | Reinhardt et al. | |
| 2015/0081474 A1 | 3/2015 | Kostka et al. | |
| 2015/0106196 A1 | 4/2015 | Williams et al. | |
| 2015/0163828 A1 | 6/2015 | Vandwalle et al. | |
| 2015/0279115 A1 | 10/2015 | Vukicevic | |
| 2015/0334548 A1 | 11/2015 | Liu et al. | |
| 2015/0351008 A1 | 12/2015 | Mayor | |
| 2016/0014609 A1 | 1/2016 | Goel et al. | |
| 2016/0063550 A1 | 3/2016 | Caldwell | |
| 2016/0086460 A1 | 3/2016 | King et al. | |
| 2016/0094598 A1 | 3/2016 | Gedikian | |
| 2016/0099758 A1 | 4/2016 | Bell et al. | |
| 2016/0188919 A1 | 6/2016 | Gao et al. | |
| 2016/0192407 A1 | 6/2016 | Fyfe et al. | |
| 2016/0277999 A1 * | 9/2016 | Graves | H04W 40/244 |
| 2016/0291127 A1 | 10/2016 | Huang et al. | |
| 2017/0019765 A1 | 1/2017 | Hoyer et al. | |
| 2017/0079001 A1 | 3/2017 | Lewis | |

FOREIGN PATENT DOCUMENTS

| | | | |
|---|---|---|---|
| WO | 043388 | 3/2016 | |
| WO | WO 2017040690 A1 * | 3/2017 | G01S 5/0294 |

\* cited by examiner

SYSTEM AND METHOD FOR BEACON FLEET MANAGEMENT

CROSS-REFERENCE TO RELATED APPLICATIONS

This application claims the benefit of U.S. Provisional Application No. 62/334,115 filed 10 May 2016 and U.S. Provisional Application No. 62/416,395 filed 2 Nov. 2016, each of which is incorporated in its entirety by this reference. This application is a continuation in part of U.S. application Ser. No. 15/446,165 filed 1 Mar. 2017, which is a continuation of U.S. application Ser. No. 15/253,376, filed 31 Aug. 2016, which claims the benefit of U.S. Provisional Application No. 62/213,467 filed 2 Sep. 2015, each of which are incorporated in their entireties by this reference.

This application is related to U.S. application Ser. No. 15/466,633 filed 22 Mar. 2017 and Ser. No. 15/288,302 filed 7 Oct. 2016 which is a continuation of U.S. patent application Ser. No. 14/956,209, filed 1 Dec. 2015, which is a continuation of U.S. patent application Ser. No. 14/463,582, filed on 19 Aug. 2014, now issued as U.S. Pat. No. 9,202,245, which claims the benefit of U.S. Provisional Application No. 61/867,493, filed on 19 Aug. 2013 and to U.S. Provisional Application No. 61/867,498, filed on 19 Aug. 2013, all of which are incorporated in their entireties by this reference.

TECHNICAL FIELD

This invention relates generally to the wireless beacon field, and more specifically to a new and useful system and method for remote beacon fleet management in the wireless beacon field.

BACKGROUND

Beacon fleet deployment, monitoring, and control are difficult due to the logistical issues posed by the massive number of beacons. This is because each beacon must be individually dealt with. This issue is compounded when a single entity (e.g., a retailer) has multiple physical locations (e.g., venues), each with multiple beacons.

Beacon fleet deployment is particularly difficult because each beacon must be individually programmed (e.g., associated with the managing entity, assigned settings, assigned permissions, associated with content, etc.). For example, each beacon must be individually placed within and assigned to a physical location to enable location-based contextual experiences; this not only requires a virtual map of the physical space for beacon deployment, but also requires a managing entity to manually assign beacons (e.g., via the respective beacon identifiers) to virtual locations on the virtual map.

On-going fleet monitoring (e.g., monitoring beacon operation, health, etc.) is also difficult because conventional beacon monitoring requires the managing entity to physically walk through the physical space to check on each beacon in-person. This can be extremely resource consuming, particularly when the managing entity has multiple locations. Furthermore, beacons can fail (e.g., fall off the wall, cease broadcasting, crash, etc.) between physical checkups, resulting suboptimal beacon operation until the next physical checkup.

On-going beacon control is also difficult because updated settings and firmware needs to be individually loaded onto each beacon. Conventionally, beacon management has required the management entity to walk through the physical space, and individually connect to and program each beacon. This can be extremely resource consuming, particularly when the managing entity has multiple locations. Furthermore, there is a risk that the managing entity forgets to update hidden beacons (e.g., beacons that the managing entity forgets are there, beacons that are visually obscured from view, etc.), leading to end-user experience inconsistencies within the beacon fleet.

Thus, there is a need in the wireless beacon field to create a new and useful system and method for beacon fleet management. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
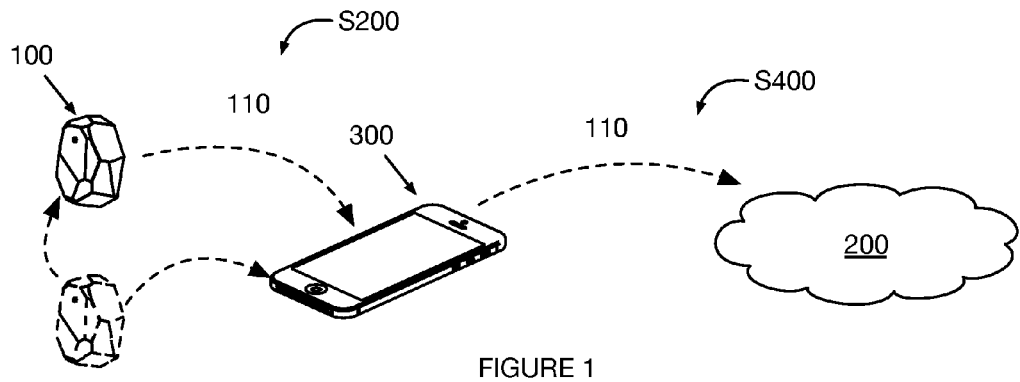
FIG. 1 is a schematic representation of the system.

As shown in FIG. 1, the system for beacon fleet management includes: a set of beacons 100, a management system 200, and an application executed on a set of user devices 300. This system functions to automatically (or pseudo-automatically) deploy, monitor, and manage the beacons.

In one example of system operation, the remote computing system functions as a centralized version control system for the beacon fleet software (e.g., source of truth for settings, content, broadcasting parameters, firmware, etc.), while the application, running on a set of customer devices, functions as the gateway (e.g., communication intermediary) between each beacon and the remote computing system.

In one example of beacon fleet monitoring, each beacon can substantially continuously record operation parameters about itself and transmit the operation parameters to the remote computing system through the application when the beacon is connected to a user device, wherein the remote computing system can track beacon operation histories to detect anomalies (e.g., changes in orientation measurements indicative of fallen-off beacons). The remote computing system can optionally notify the managing entity of the anomaly, and/or recommend corrective action.

In one example of beacon fleet control, the managing entity can specify updated beacon parameters (e.g., settings), which are stored at the remote computing system. The remote computing system subsequently pushes the updated beacon parameters to the application, wherein the application pushes the updated settings to the beacons when the user device running the application is connected to said beacon(s). The updated beacon parameters can be individually addressed (e.g., to individual beacons), universal to a beacon population, or be otherwise assigned to segments of the beacon population.

2. Benefits

This system and method confers several benefits over conventional beacon fleet management system and methods.

First, the system and method can enable easy and/or automated physical space beacon mapping. This can be enabled by using beacons that: include sensors (e.g., orientation sensors, etc.), can selectively scan for beacon identifiers and/or broadcast beacon identifiers, or have other functionalities.

Second, the system and method can enable automated, continuous status monitoring for a plurality of beacons. This can be enabled by using beacons that monitor their own operation parameters and selectively transmit the operation parameters (or information derived therefrom) to the remote computing system. Furthermore, by tracking each beacon's operation history at the remote computing system (e.g., instead of at the beacon, which has limited memory, or by the application, whose instances are not synchronized across multiple user devices), the system has a central repository for beacon operation analysis. This centralized system enables comparison between data, received from different user devices, for the same beacon to identify anomalies. This centralized system also allows for beacon parameter comparison to parameters for other beacons (e.g., within the same population or different populations) to automatically normalize beacon parameters. This centralized system also enables parallel prototyping of multiple anomaly determination modules, rapid training set development across multiple beacon populations, or confers any other suitable benefit.

Third, the system and method can enable automatic control for a plurality of beacons. This can be enabled by providing a centralized version control system (CVCS; e.g., the remote computing system) that manages each beacon's operation parameters (e.g., settings, firmware, etc.), such that the managing entity can interface with the CVCS instead of with the beacons directly. However, the system and method can confer any other suitable benefit.

Figure 9:
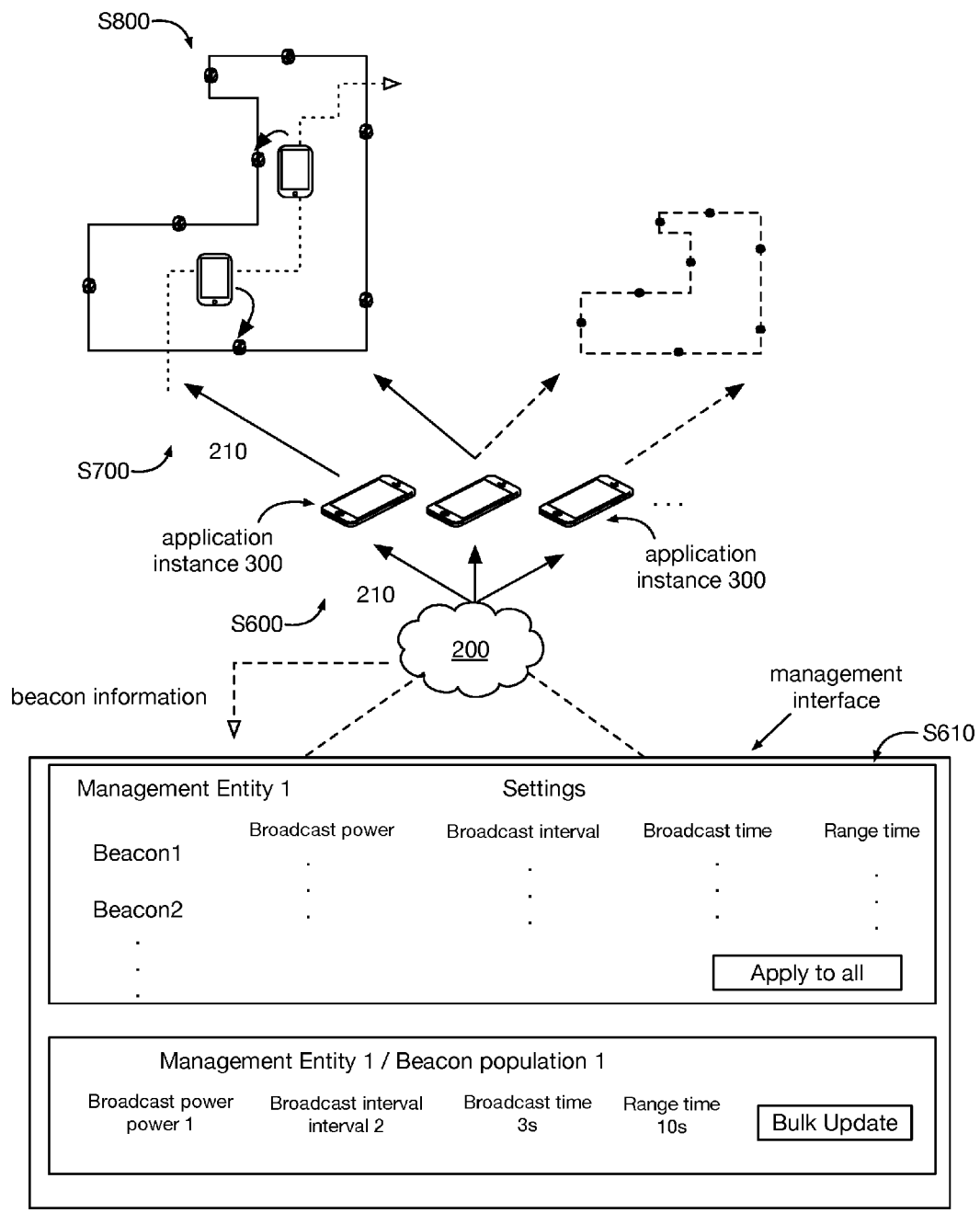
FIG. 9 is a schematic representation of an example of crowdsourced beacon population management, including a first and second example of the management interface.
Figure 10:
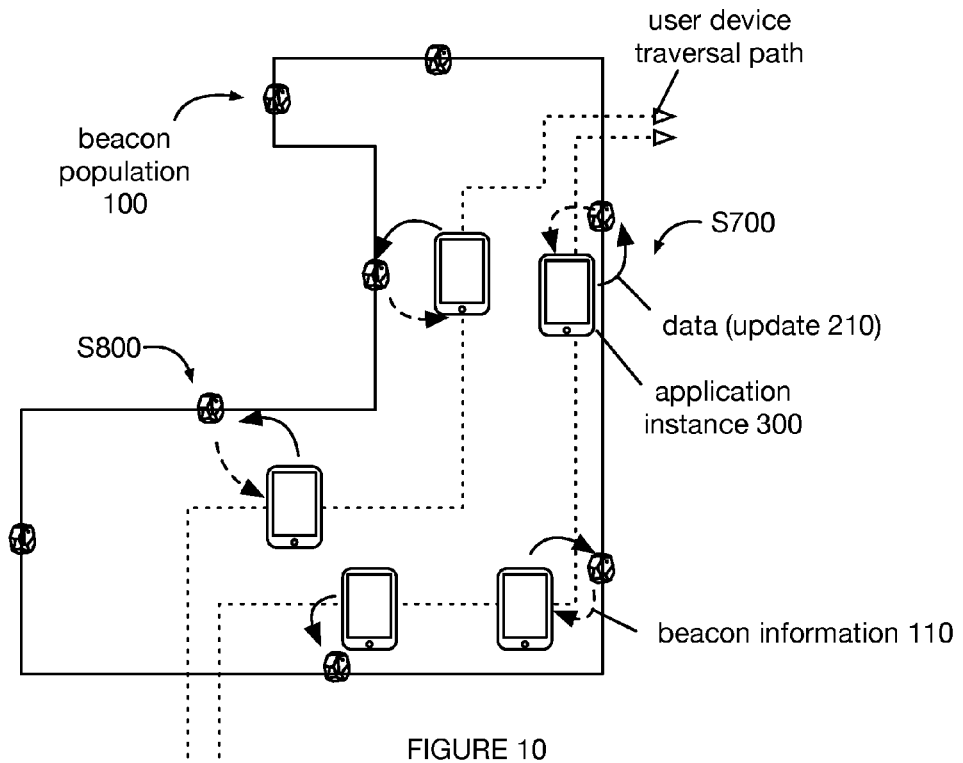
FIG. 10 is a schematic representation of an example of crowdsourced beacon population updating.
Figure 11:
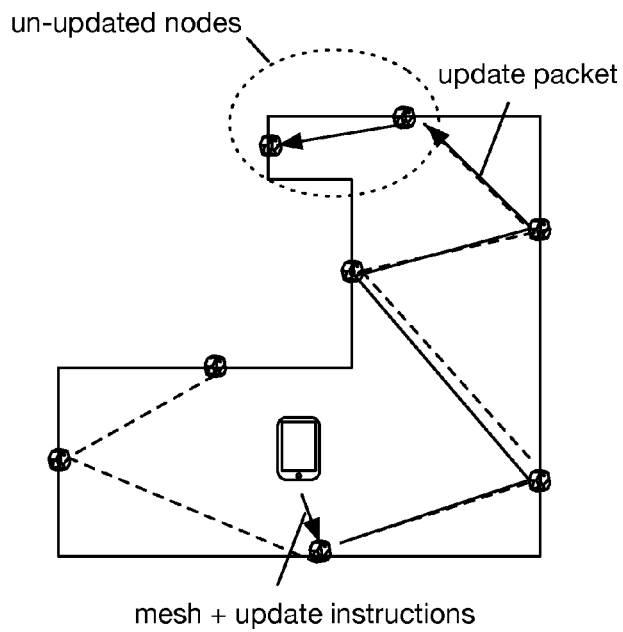
FIG. 11 is a schematic representation of an example of beacon updating using a mesh network.

Fourth, the system and method can crowdsource beacon control and/or monitoring (examples shown in FIGS. 9 and 10), which can reduce the burden of managing a beacon population on a beacon manager (e.g., IT personnel). This is preferably accomplished by leveraging a plurality of user devices, more preferably the applications executing on the user devices, as a gateway or intermediary to the centralized system. In a first variation, the remote computing system can push beacon updates 210 to instances of an application associated with the beacon population (to be updated), wherein the update is propagated to each beacons within the beacon population as instances of the application encounter (e.g., connect) to said beacons through typical use. In a specific example, the update for Target™ beacons can be pushed to a Dawn™ application, wherein mobile devices (e.g., user devices, smartphones, etc.) executing the Dawn™ application can update Target™ beacons as the users pass by the respective beacons within multiple Target™ locations. In a second variation, different instances of the application executing on separate and distinct mobile devices can forward beacon operation parameters to the centralized system as the beacon packets are received by the respective applications, such that operation records for each beacon can be aggregated from multiple sources over time.

3. System.

As shown in FIG. 1, the system for beacon fleet management can include: a set of beacons 100, a management system 200, and an application 300. They system functions to facilitate simple and/or automatic beacon set deployment, monitoring, and control.

3.1 Beacon

The beacon(s) 100 of the system functions to broadcast a packet, wherein the packet can be used to retrieve information (e.g., settings) associated with the beacon. The beacons can be statically positioned within a physical space (e.g., at known locations, with known orientations, etc.) to enable location-based user experiences, wherein the location of the user device can be determined (e.g., trilaterated) based on the known location of the beacon(s) from which packets are received (e.g., within a predetermined time period). The beacons can additionally or alternatively be coupled to a mobile object to enable automatic retrieval of object-related content. However, the beacons can be otherwise used. In one example, the retrieved information can be product information for a product associated with the beacon. In a second example, the retrieved information can be for a geographic region associated with (e.g., encompassing or proximal) the beacon. In a third example, the retrieved information can be a link (e.g., a URI) from which information can be retrieved. However, the information associated with the beacon can be any other suitable information.

The packet 110 can include: a beacon identifier (e.g., broadcast identifier, static identifier, etc.), protocol version, hardware revision, software version (e.g., operation setting version number, firmware version number, etc.), sensor measurements (e.g., temperature, battery voltage, x,y,z-axis acceleration, current and previous motion state duration, power, uptime, x,y,z-axis magnetometer data, ambient light level, etc.), radio metrics (e.g., number of pairings, number of unique devices that have been paired with, etc.), information based on the measurements, operation alerts (e.g., beacon fallen), or any other information. The beacon can additionally function to process the measurements into summary data, operation alerts, or any other suitable information. The beacon can additionally erase transient data (e.g., sensor measurements) periodically, after connection to a connected user device (e.g., application), after transmission to a connected user device, or at any other suitable time.

The beacons 100 are preferably associated with a static identifier and a broadcast identifier, wherein the beacon broadcasts the broadcast identifier and the remote computing system translates the broadcast identifier into the static identifier to identify the beacon. The broadcast identifier can remain substantially static, change (e.g., at a predetermined frequency, upon occurrence of a predetermined event, etc.), or be otherwise controlled.

The beacons 100 preferably function as slave devices, but can additionally or alternatively constantly or periodically function as master devices. Each beacon can additionally function to substantially continuously monitor its own operation by recording sensor measurements (e.g., periodically, every second, etc.), communicate the recorded sensor measurements to connected systems (e.g., user devices, other beacons, etc.), identify anomalous beacon operation (e.g., based on sensor measurement processing, etc.) and automatically take action on the anomaly (e.g., broadcast a distress signal), function as a master device (e.g., scan for broadcasts), function as an intermediary between a second beacon and an endpoint (e.g., the application, the remote computing system, etc.), or perform any other suitable functionality.

The system preferably includes a plurality of beacons, but can alternatively include a single beacon or any other suitable number of beacons. The plurality of beacons is preferably associated with a single account (e.g., user account associated with the managing entity), but can alternatively be associated with a plurality of accounts. The system can include multiple beacon pluralities (e.g., each associated with a different user account), but can alternatively include any suitable number of beacons.

Figure 13:
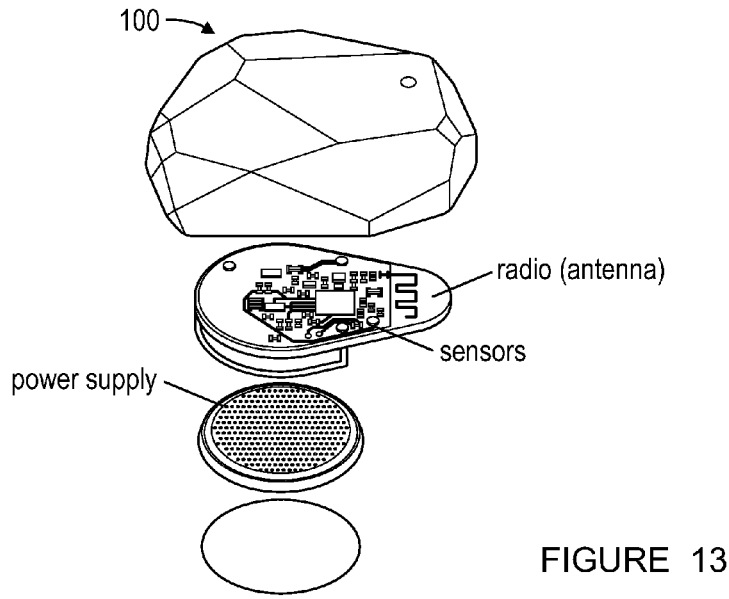
FIG. 13 is an exploded view of an example of the beacon.

The beacon can include: a radio, a sensor, a processing system, a power source, or any other suitable component (example shown in FIG. 13).

The radio of the beacon functions to transmit and/or receive data packets. The data packets can be beacon identifiers, control instructions, information identifiers (e.g., a URI), or any other suitable data. The beacon identifier can be a globally unique identifier, a locally unique identifier (e.g., unique among beacons within a geographic region), a temporally unique identifier (e.g., unique among beacons concurrently active), a non-unique identifier, or any other suitable identifier. The beacons preferably broadcast the beacon identifier periodically, continuously, when a trigger event occurs, or at any other suitable time. The beacon identifier can be static (e.g., permanently assigned to the beacon), variable or dynamic (e.g., periodically assigned to the beacon), or otherwise configured. The variable beacon identifier can be automatically generated based on a static identifier associated with the beacon (e.g., calculated), randomly assigned, or otherwise determined. The variable beacon identifier can be generated by a remote computing system, the beacon, a secondary beacon system, a user device, or any other suitable computing system. The variable beacon identifier can be resolved into the beacon's static identifier by a receiving device or system connected to the receiving device (e.g., using the equation, etc.). The variable beacon identifier can be resolved in the manner disclosed in U.S. application Ser. No. 14/463,582 filed 19 Aug. 2014, which is incorporated in its entirety by this reference, or be otherwise resolved. The broadcast beacon identifier can be received by the user device, beacon system(s), other beacons, or by any other suitable device proximal the beacon.

The beacon can broadcast multiple packet types. Packet types that can be broadcasted include: content packets (e.g., used to retrieve and/or display content), telemetry packets (e.g., e.g., used to monitor the beacon operation parameters), or any other suitable packet. All packets preferably include a beacon identifier (e.g., broadcast identifier, etc.), but can include any suitable information. Examples of the packets include: iBeacon, Eddystone (e.g., Eddystone-UID, Eddystone-URL, Eddystone-TLM, Eddystone-EID, etc.), Estimote telemetry, or any other suitable packet. The beacon can broadcast one or more packet types throughout a broadcasting period, wherein different packet types are broadcast by the same or different radios. In one variation, a single radio alternates between broadcasting different packet types. In a second variation, multiple radios substantially concurrently (e.g., within a predetermined time interval) each broadcasts a different packet type (e.g., a primary and secondary packet broadcast by a primary and secondary radio, respectively). However, the packets can be otherwise broadcast.

The beacon can broadcast only, listen only, broadcast and listen (e.g., concurrently or asynchronously), or perform any other suitable functionality. When the beacon broadcasts and listens concurrently, the beacon can use the same radio to broadcast and listen, or use different radios. The beacon can broadcast and listen using the same protocol or different protocols. The radio is preferably selectively operable between broadcasting and listening (e.g., periodically switch states, etc.), wherein the processing system preferably operates the radio between the two modes, but can alternatively be otherwise operated. When the beacon receives data packets, the beacon can unpack the data packet, forward the data packet, or otherwise manage the data packet. The beacon can additionally determine the strength of the received signal, wherein the signal strength can be used to determine the transmitting beacon's SOC, trilaterate or triangulate the transmitting beacon's location, or otherwise used.

The radio can include a transceiver and an antenna, but can alternatively include any other suitable component. The transceiver can be integrated into the processing system or be separate. The antenna can extend along the beacon system length (e.g., along the longitudinal axis, along the inner or outer perimeter, etc.), extend along the beacon system width, or extend along any other suitable portion of the beacon system. The antenna is preferably arranged distal the data connector (e.g., to avoid electromagnetic interference), but can alternatively be arranged proximal the data connector or be arranged in any other suitable location on the beacon system. The antenna is preferably an omnidirectional antenna, but can alternatively be a directional antenna or be any other suitable type of antenna. The beacon can include one or more radios. The radio is preferably for a short-range communication technology, but can additionally or alternatively be for a long-range communication technology. Examples of the radio include: a Bluetooth radio, a BLE radio, a UWB radio, a BLE long range radio (e.g., 10 dB), an LTE-M radio, a WiFi radio, a WLAN radio, a WiMAX radio, a Zigbee radio, a NFC radio, or any other suitable short or long range repeater, extender, protocol translator, or other suitable means for conducting a one-way or two-way communication protocol. In a specific example, the radio includes a 2.4 GHz BLE radio. In one variation, the beacon can concurrently broadcast multiple packets from the same or different radios. In a second variation, the beacon radio can be dynamically reconfigurable (e.g., by the processing system). The beacon radio can be reconfigured based on a selected beacon operation mode (e.g., broadcasting mode, updated parameter distribution mode, etc.), based on the operating environment (e.g., adjusted to compensate for EMI and/or magnetic field disturbances, as determined using the magnetometer), or be otherwise reconfigured.

The sensor(s) functions to monitor operation parameters of the beacon system (e.g., beacon telemetry data). The operation parameters can include beacon system parameters (e.g., power storage SOC, user connection frequency, internal temperature, physical orientation, etc.), environmental parameters (e.g., ambient temperature, ambient light, ambient noise, vibration, etc.), or include any other suitable parameter. The beacon system can include one or more sensors of the same or different type. The sensors can be on-board the beacon (e.g., mounted to or within the beacon housing), connected to the beacon (e.g., via a wired connection, such as GPIO pins, via a wireless connection, etc.), or otherwise associated with the beacon. The sensor can be an orientation sensor (e.g., accelerometer, gyroscope, etc.), magnetometer, altimeter, microphone, transducer, temperature sensor, pressure sensor, light sensor (e.g., camera, ambient light sensor), or be any other suitable sensor.

The processing system of the beacon system functions to control identifier broadcasting, control data transfer between the beacon system and the user device, control data transfer between the beacon system and remote computing system, manage beacon system operation between the set of operation modes, or perform any other suitable functionality. The beacon system can include one or more processing systems of the same or different type. The processing system can be a CPU, GPU, microprocessor, or be any other suitable processing system. The processing system can additionally include memory (e.g., RAM, flash) that stores the beacon settings, firmware, sensor measurements, content (e.g., URLs, location-or context-specific content), or other information. The processing system can additionally include clocks or include any other suitable component. The processing system is preferably electrically coupled to (e.g., connected to) and communicates with the radio, sensor(s), or any other suitable component.

The power source of the beacon system functions to power the beacon system components. The beacon can be operable in a single power class, multiple power classes, or any other suitable power class. The power source is preferably wired to the powered components, but can alternatively be wirelessly connected to the powered components (e.g., via induction). The beacon system can include one or more power sources of the same or different type. In a first variation, the power source is a battery housed within the beacon system. The battery is preferably a secondary battery (e.g., rechargeable battery), but can alternatively be a primary battery or be any other suitable battery. Examples of the battery can include lithium chemistry batteries, nickel cadmium batteries, CR2477 batteries, or any other suitable battery. In a second variation, the power source is a power connector configured to plug into an external power source. The power connector can be integrated with the data connector, but can alternatively be a separate power connector. Examples of the power connector include: a wall outlet plug, a set of pins, an induction coil, or any other suitable power connector. However, the beacon system can include any other suitable power source.

The beacon can additionally include a housing that functions to mechanically encapsulate the beacon components. The housing can be made of plastic, metal, ceramic, or from any other suitable material. The housing preferably entirely encapsulates the beacon components, but can alternatively partially expose the components or otherwise encapsulate the components. The housing can optionally include a mounting mechanism that functions to mount the beacon to a mounting surface. Examples of the mounting mechanism include: adhesive, hooks, clips, screws, or any other suitable transient or permanent mounting mechanism. The beacon can optionally include external connectors (e.g., GPIO pins) that connect to auxiliary devices and communicate information (e.g., control information, sensor information, etc.) to and/or from the auxiliary device. However, the beacon can include any other suitable component.

3.2 Management System

Figure 12:
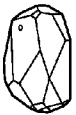
FIG. 12 is a specific example of a beacon management interface.

The management system 200 of the system functions as a centralized system for beacon parameter control. For example, the management system can receive an update 210 (e.g., settings) for a set of beacons from a management entity (e.g., through an application programming interface, such as a RESTful API or graphic user interface, example shown in FIG. 12), push the new settings to the beacon set, track which beacons of the set have and have not received the new settings, and initiate alternative updating paths to update those beacons that have not received the new settings. The management system functions as a centralized repository for beacon measurement aggregation over time, which allows the management system to function as a beacon monitor. The management system can additionally function as an automated mapping system that automatically determines the relative location of each beacon within a physical space.

The management system can function to store beacon identifier associations with content, wherein the associations can be received from the management entity or otherwise determined. The management system can function to return content associated with a beacon identifier to an application on a user device connected to and/or detected the beacon identifier. The management system can function to store preferences, beacon identifiers, beacon settings (e.g., for a beacon set), virtual maps of physical spaces, permissions (e.g., management entity permissions for the population beacons, etc.), or other information in association with a user account (e.g., managing entity). The management system can function to store static identifier(s), broadcast identifier(s), settings, firmware version(s), protocol version(s), operation history (e.g., sensor measurement history), location identifiers (e.g., virtual or physical; relative or absolute), or any other suitable information for a beacon. The management system can additionally or alternatively: resolve broadcast beacon identifiers into static beacon identifiers, verify access to beacon information, verify access for beacon setting adjustment, monitor beacon performance (e.g., wherein the management system automatically sends a notification to replace a beacon or clone the beacon settings when the beacon SOC falls below a threshold, etc.), migrate beacon settings from a first beacon identifier to a second beacon identifier, determine and/or coordinate multi-beacon broadcast, or perform any other suitable functionality. However, the management system can perform any other suitable functionality.

The management system preferably includes a remote computing system (e.g., a DNS system) including one or more servers, but can alternatively or additionally include a beacon (e.g., a master beacon), a user device (e.g., a native application executing on the user device, a browser application on the user device, etc.), or be any other suitable computing system. The servers can be RESTful, RESTless, or be otherwise configured.

3.3 Application.

The application 300 of the system functions as an interface between the beacon, the management system, and the user. The application can scan for beacon packets, request content from the management system based on the beacon packets, and display the content to the user. The application can additionally connect to the beacons, push updated beacon parameters (e.g., settings) to the beacons, associate user device information (e.g., sensor measurements) with the beacon information (e.g., beacon packets, information extracted from beacon packets, etc.) prior to transmission to an endpoint (e.g., the management system, a second beacon, etc.), or perform any other suitable functionality.

The application is preferably executed by a user device, but can be otherwise run. The application can be automatically launched (e.g., in response to detection of a beacon associated with the application; in response to user device location within a predefined geofence, etc.), manually launched, launched based on content received from the beacon (e.g., a URI), constantly run in the background, or otherwise executed. The user device can be a customer device, employee device, a managing entity device, or belong to any other suitable user. When the application is run on other user devices aside from the managing entity device, the system can function to crowdsource beacon setup, monitoring, and/or maintenance by leveraging the frequency of other users being proximal the beacons. The application can be a native application, a browser application, an integrated operating system-level application, or any other suitable application. The system can include multiple applications, each associated with a different managing entity. For example, Target™ can be associated with a first application, while Nike™ can be associated with a second application different from the first application. All applications are preferably connected to the management system through a common SDK (software development kit), but can alternatively be connected to the management system or other endpoint in any other suitable manner. Each application instance (e.g., wherein an instance is the application running on one user device or logs in one user account) can additionally be associated with a user account, wherein the user accounts can be associated with customers, employees, or other entities associated with the managing entity.

The user device functions to execute the application, to present information to a user, and as a gateway and/or translation layer. For example, the user device can forward the beacon information, transmitted by the beacon to the user device over a short-range protocol, to a router or cellular tower supporting a long-range communications protocol that enables transmission to the centralized system. The system is preferably implemented with a plurality of user devices, more preferably a plurality of application instances, each application instance executing on a separate and distinct user device, but can be otherwise implemented. The user device preferably functions as a master device, but can alternatively or additionally function as a slave device (e.g., periodically, continuously, etc.). The user device is preferably a mobile device associated with the user (e.g., through a user account), and can include mobile phones, laptops, smartphones, tablets, watches, or any other suitable mobile device. The user device can include: one or more data connections (e.g., radios), user outputs (e.g., display, speakers, etc.), user inputs (e.g., touchscreen, keyboard, microphone, camera, etc.), sensors (e.g., orientation sensors, optical sensors, acoustic sensors, location systems, etc.), power storage, and/or any other suitable component. The one or more data connections function to communicate data with the remote computing system and/or one or more beacons. The data connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system.

4. Method

Figure 2:
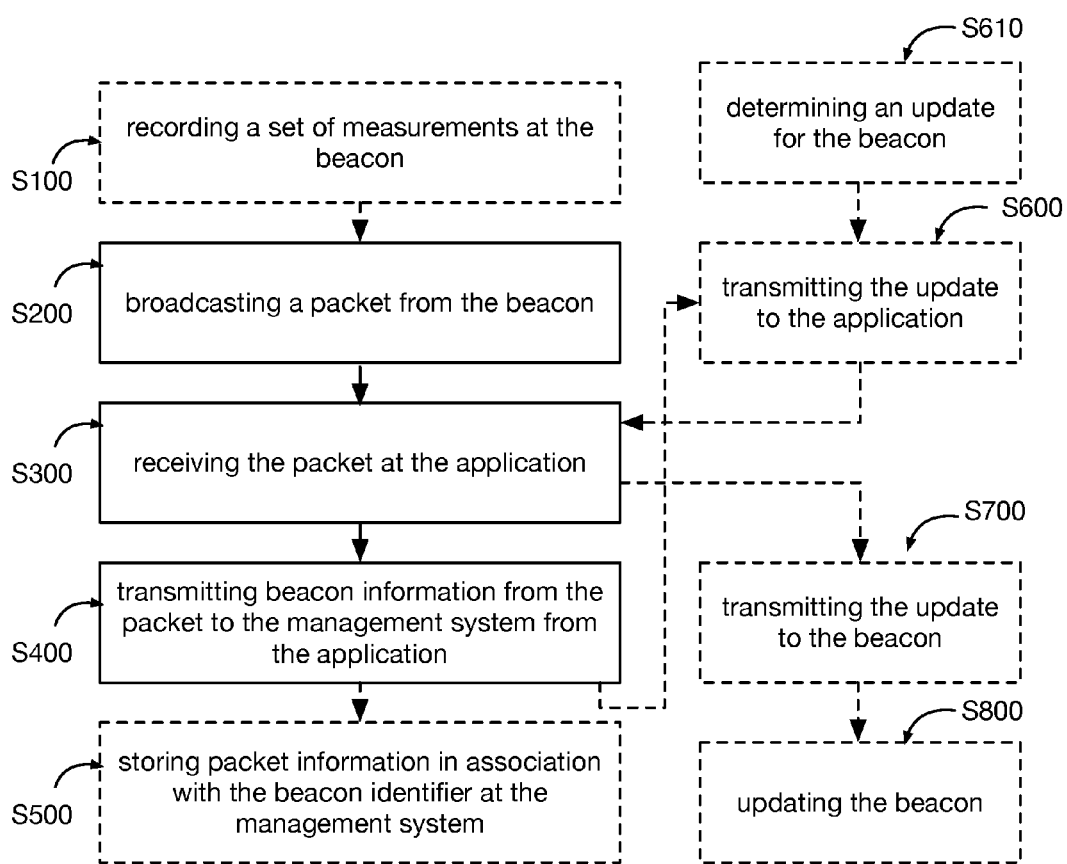
FIG. 2 is a schematic representation of the method.

As shown in FIG. 2, the method for remote beacon fleet management includes: broadcasting a packet from the beacon S200; receiving the packet at the application S300; and transmitting beacon information extracted from the packet to the management system from the application S400. The method can optionally include: recording a set of measurements at the beacon S100; and storing the information in association with the beacon identifier at the management system S500, wherein the packet includes beacon information based on the set of measurements. The method can optionally include automatically deploying the beacons, including: automatically determining initial settings for the beacons based on the information. The method can optionally include automatically monitoring beacon performance based on the information, including automatically determining anomalous beacon operation based on the stored information and sending an alert to a user account associated with the beacon in response to anomalous operation determination. The method can optionally include remotely controlling the beacons, including: determining an update for the beacon; sending the update to the application S600; in response to application connection with the beacon, sending the update from the application to the beacon S700; and automatically updating the beacon in response to receipt of the update S800. The method can be performed by the system disclosed above, or be performed by any other suitable system.

From the beacon's perspective, the method can include, at the beacon: measuring a set of parameters; packaging the measurements into a packet; and broadcasting the packet. The method can additionally include: receiving an update from an application and installing the update. The method can additionally include, at the beacon: forming a mesh network with secondary beacons within the physical space (e.g., within a predetermined distance of the beacon); and transmitting the update to secondary beacons via the mesh network. The method can additionally include, at the beacon: identifying an anomaly based on the parameter set; generating an alert based on the anomaly; and broadcasting the alert (e.g., concurrently with the packet, asynchronously with the packet, in lieu of the packet, etc.). The method can additionally include, at the beacon: scanning for broadcast packets; determining a physical distance to a second beacon (e.g., based on time-of-flight, as determined from the packet transmission time and receipt time); and transmitting the physical distance value to the application. This can additionally include creating a graph of RSSI values based on the physical distances, wherein the graph is transmitted (e.g., retrieved, pushed, etc.) to the management system via the user device. However, the beacon can additionally or alternatively perform any other suitable process.

From the application's perspective, the method can include, at the application (e.g., at an instance of the application running on a user device): scanning for beacon packets; receiving a beacon packet from a beacon; transmitting the beacon packet to the management system; receiving content from the management system based on the packet; and displaying the content. The method can additionally or alternatively include: determining the user device location based on a known location for the beacon (e.g., using trilateration based on multiple beacon signals and the respective beacon locations, signal analysis such as RSSI, beacon range association with a geofence or label, etc) using the same or different packet received from the beacon. The method can additionally or alternatively include: recording user device parameters with the application; packaging the user device parameters with the beacon packet into a transmission packet; and transmitting the transmission packet to the management system. The method can additionally or alternatively include: receiving an update for the beacon from the management system; and transmitting the update to the beacon. The method can additionally or alternatively include: comparing the new update version received from the management system with the update version identified by the beacon packet, and selectively transmitting the update to the beacon in response to the new update version differing from (e.g., sequentially following) the beacon update version. However, the application can additionally or alternatively perform any other suitable process.

From the management system's perspective, the method can include, at the management system: receiving a beacon identifier from an application; retrieving content associated with the beacon identifier; and sending the content to the application. The method can additionally include, at the management system: receiving relative beacon positioning data (e.g., orientation data for the beacon; positioning data between the beacon and a second beacon) from the beacon (e.g., directly or via the application); and automatically generating a map of the physical space based on relative beacon positioning data from multiple beacons associated with the management entity. The method can additionally include: receiving beacon sensor data for a beacon; storing the beacon sensor data in a beacon history for the beacon; analyzing the beacon history and/or beacon sensor data for anomaly events; and automatically generating an alert for a managing entity in response to identification of an anomaly event. The method can additionally include: receiving updates for a set of beacons from a user account (e.g., from a managing entity); sending an update package to a set of applications, wherein the applications transmit the update package to the respective beacons; receiving beacon packet from the beacons within the set (e.g., via the same or other application instances); and verifying that the beacon has been updated based on the beacon package (e.g., when the setting version matches the most recent setting version; when the time of last update is after the update had been pushed to the applications, etc.). The method can alternatively include: receiving a beacon packet from an application; determining the beacon's update version; and in response to the beacon's update version differing from the current version, pushing the current update version to the application for transmission to the beacon. However, the management system can additionally or alternatively perform any other suitable process.

4.1 Recording Measurements at the Beacon

Recording a set of measurements at the beacon S100 functions to gather data that can be subsequently used to: deploy the beacon (e.g., automatically determine initial settings for the beacon), monitor beacon operation (e.g., identify anomalous operation events), or be used in any other suitable manner. Measurements that can be recorded include: system temperature, ambient temperature, power storage parameters (e.g., voltage, current, SOC, etc.), acceleration (e.g., x,y,z-axis acceleration), processor operation (e.g., uptime, power draw, etc.), EMI data (e.g., x,y,z-axis magnetometer measurements), ambient light level, ambient pressure, humidity, or any other suitable measurement. The measurements can be timestamped or otherwise associated with a reference value. The measurements can be temporarily stored by the beacon on-board storage (e.g., until transmission or processing), but can alternatively be permanently stored, not stored (e.g., immediately processed then discarded), or otherwise retained.

4.2 Broadcasting a Beacon Packet

Broadcasting a packet from the beacon S200 functions to communicate beacon information, such as beacon identifiers, beacon locations, on-board sensor measurements, data derived therefrom, or other information to an external system. The information based on the set of measurements can include measurement summaries (e.g., measurement value duration, such as current and previous motion state duration, uptime, etc.; parameter ratios, such as power consumption to SOC ratios, etc.), anomalous beacon operation alerts, the raw measurement values, or any other suitable information. In the variation where the information includes anomalous beacon operation alerts, the method can additionally include: storing an anomaly detection module on the beacon; and identifying anomalous beacon operation, based on the measurements using the anomaly detection module, by the beacon. The packet can include: a beacon identifier (e.g., broadcast identifier, static identifier, etc.), protocol version, hardware revision, software version, sensor measurements, information based on the measurements, operation alerts, or any other suitable information.

The packet can be continuously broadcast, broadcast at a predetermined frequency, broadcast on a schedule, broadcast in response to the occurrence of a predetermined event, or at any other suitable time. Packets broadcast at adjacent times can include the same information types, different information types, or any other suitable set of information types. Packets broadcast at adjacent times can include the same information or different information. Different packets can be broadcast using different radios (e.g., beacon information using a low-energy, low-range protocol; measurement information using a high-energy, short-range protocol, etc.). Alternatively, the beacon can broadcast a single packet type using the same radio.

In one variation, the beacon can broadcast a first information set (determined based on a first measurement set) until beacon connection with an application (e.g., with a user device); and delete the information based on the first information set after beacon connection with the application. The beacon can record a second measurement set while the beacon broadcasts the first information set, and begin broadcasting the second measurement set after beacon connection with the application. The first and second measurement sets preferably include measurements recorded during separate and discrete timepoints, but can alternatively include overlap temporally, or be otherwise related. Alternatively, the beacon can switch between broadcasting the first and second information sets, concurrently broadcast both information sets, or broadcast the information sets at any other suitable time in any suitable order. However, the beacon can broadcast any other suitable information.

4.3 Receiving the Beacon Packet at the Application

Receiving the packet at the application S300 functions to leverage the user device as an intermediary between the beacon and the management system. The packet is preferably received by the user device (e.g., a customer device, managing entity device, etc.), more preferably at an instance of the application running on a user device, but can alternatively be received by any other suitable system. Receiving the packet at the application preferably includes: scanning for beacon packets with the application and receiving packets broadcast by beacons proximal the user device. The application can scan for beacon packets at a predetermined frequency, continuously, in response to the occurrence of a predetermined event, or at any other suitable time. The application preferably scans using a short-range radio of the user device (e.g., the BLE radio), but can alternatively scan using any other suitable radio. The application preferably operates the user device in a master mode, but can alternatively or additionally operate the user device in a slave mode (e.g., continuously, periodically, etc.). However, the packet can be otherwise received.

The method can additionally include launching the application prior to packet receipt. In a first variation, the application is run in the background of the user device, and is launched upon user device operation (e.g., when the user device is turned on). In a second variation, the application is automatically executed in response to user device location within (or proximity to) a predetermined geofence (e.g., venue boundary), wherein a secondary application on the user device monitors user device location and automatically launches the application. In a third variation, the user manually launches the application. In a fourth variation, the application is automatically executed in response to receipt of a beacon packet. In this variation, the user device radio can scan for packets (e.g., the Bluetooth radio can remain active), receive a packet broadcast by a beacon, and launch the application based on information within the packet. However, the application can be otherwise initiated.

4.4 Transmitting Packet Information to the Management System.

Transmitting beacon information to the management system from the application S400 functions to communicate the information based on the measurement set to the management system. This preferably includes transmitting the packet from the user device that received the packet, but can alternatively include transmitting the packet from any other suitable device. All or a portion of the packet can be transmitted. In the latter variation, the application can unpack the packet, select and/or process information from the packet for transmission (e.g., extract a beacon identifier, telemetry data, version numbers, etc.), and transmit the selected and/or processed information to the management system. The packet information can be transmitted immediately after receipt, within a predetermined time after receipt, after a predetermined duration after receipt, or at any other suitable time. The packet is preferably transmitted via a long-range communication protocol supported by the user device (e.g., WiFi, wherein the data is transmitted to the management system through an intermediary router or other WAP; cellular; etc.), but can be otherwise transmitted.

4.5 Storing the Packet Information at the Management System.

Storing the information in association with the beacon identifier at the management system S500 functions to record a beacon operation history. The information is preferably stored in association with the beacon identifier, more preferably the beacon static identifier but alternatively the beacon broadcast identifier (e.g., resolved into the static identifier by the application or management system based on a rule set shared with the beacon, wherein the rule set can be static or rotate, etc.), but can alternatively or additionally be stored in association with the user account or otherwise stored. The beacon operation history can be stored for all time (e.g., for the entire duration that the beacon is associated with the user account), stored for a predetermined duration (e.g., for the last day, last week, last month, etc.), or stored for any other suitable time duration. In one variation, different beacon operation resolutions can be stored for different time durations. For example, current beacon operation instructions are summarized into summary data once it surpasses a predetermined age.

4.6 Beacon Deployment.

The method can optionally include automatically deploying the beacons, which functions to automate or partially automate initial beacon setting assignment. This can include automatically determining initial settings for the beacons, where initial settings can include: physical beacon location, beacon orientation, ambient parameter values for a predetermined setting (e.g., ambient light level associated with a broadcasting mode), or any other suitable setting.

Figure 3:
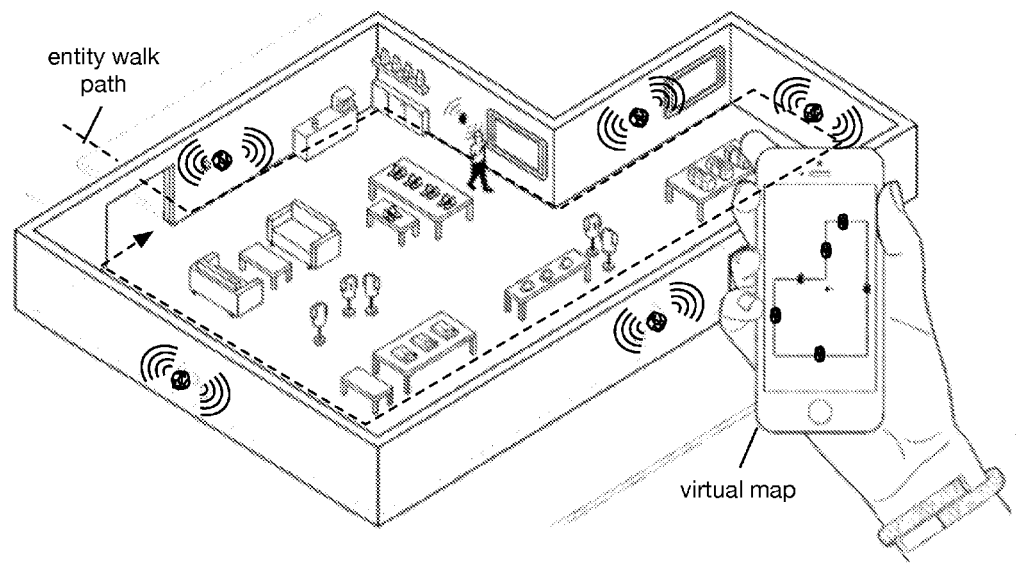
FIG. 3 is a schematic representation of a specific example of a first variation of automatic beacon deployment.

In a first variation, example shown in FIG. 3, the management entity can position the beacons within the physical space, launch the application on their device (e.g., smartphone), and walk around the physical space. This can enable a user to automatically assign the beacon locations by simply walking by the beacons.

In one embodiment, the application can scan for beacon packets broadcast by the beacons as the entity walks through the space, associate the packets with the device location (e.g., measured or estimated), and automatically virtually locate the beacons within the space. When the entity walks about the perimeter of the space (which can be promoted by the beacons, as they are typically attached to walls), the system (e.g., management system) can additionally automatically generate a virtual map or determine parameters of the space (e.g., length of walls, angles between walls, etc.).

In one example, the beacon can be virtually located within a preexisting virtual map of the space, based on the device location associated with the time of beacon identifier receipt. The beacon location can additionally be determined based on the map, the device location, and the beacon sensor measurements. In a specific example, the beacon location can be determined based on a position on the map proximal the device location, wherein the space surface (e.g., wall, floor, ceiling, etc.) is determined based on the beacon accelerometer measurements. In a second example, the beacon can be virtually located within a preexisting virtual map of the space based on the beacon's location relative to other beacons within the space. In a specific example, a beacon receives packets from adjacent secondary beacons, determines the secondary beacon distance from the beacon (e.g., based on time of flight, as determined from the broadcast time and receipt time), and determines the secondary beacon locations within the space based on a known location of the beacon within the space, the secondary beacon distance from the beacon, and the virtual map (e.g., locations within the virtual map having similar distances as the secondary beacon distances).

In a second embodiment, the application can scan for beacon packets broadcast by the beacons as the entity walks through the space, receive beacon packets from the beacons as the entity walks through the space, associate the packet information with the receipt time, record a timestamped series of device locations and/or orientation information (e.g., accelerometer, etc.) as the entity walks through the space, and send the timestamped beacon packet information (e.g., beacon identifier) and device locations to the management system. The management system can associate a physical location with the beacon identifier (e.g., determined from the beacon packet information). The physical location can be the device location timestamped with a time within a threshold time duration of the beacon packet receipt timestamp, an estimated physical beacon location, or be any other suitable location. The estimated physical beacon location can be determined from the device location and the packet time of flight (e.g., determined from the difference between the packet broadcast time and the packet receipt time). In one example, the management system can identify a first beacon identifier recorded at a first and second timestamp from the timestamped beacon packet information, identify the first and second device locations associated with the first and second timestamps, determine a first and second time of flight for the first and second instances, respectively, of first beacon identifier recordation, and determine (e.g., triangulate) the location of the first beacon based on the first and second device locations and the first and second times of flight. However, the physical beacon location can be otherwise determined.

Figure 4:
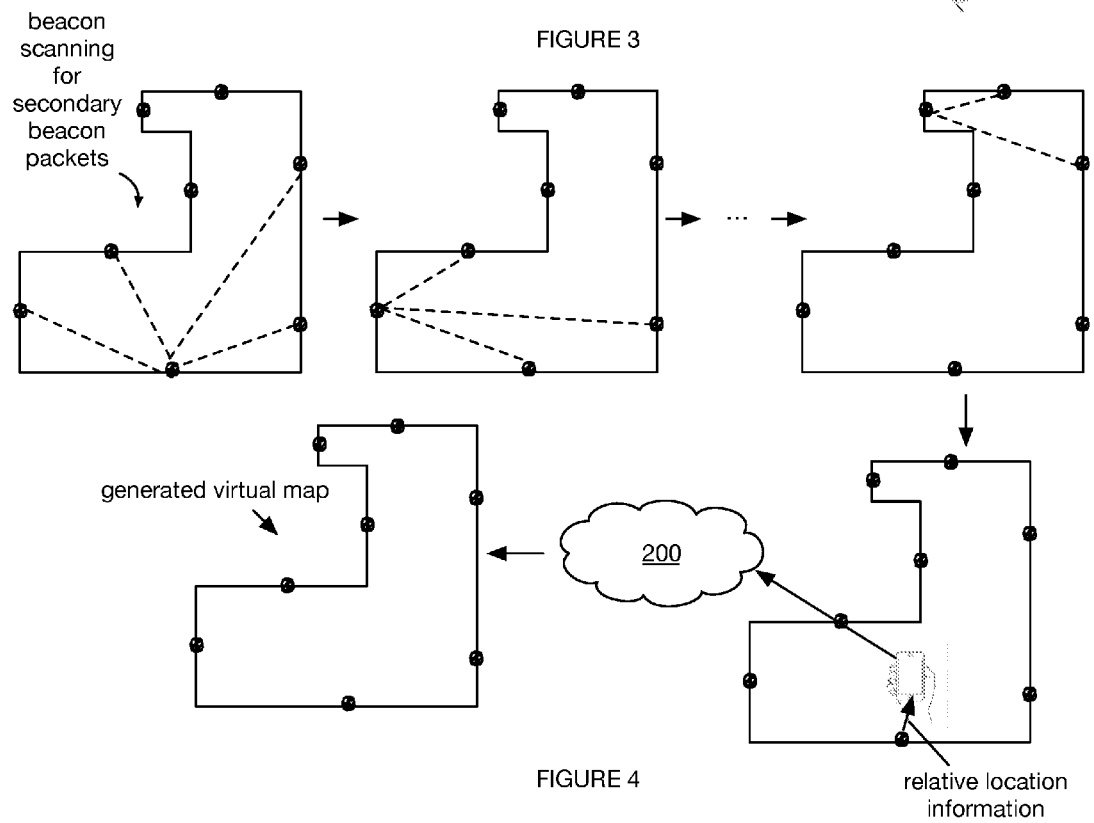
FIG. 4 is a schematic representation of a specific example of a second variation of automatic beacon deployment.

In a second variation, example shown in FIG. 4, the management entity can position the beacons within the physical space, wherein the beacons can cooperatively automatically map the physical space based on the relative position of other beacons within the space (e.g., based on packet broadcast time of flight, beacon orientation, etc.). This can further simplify beacon setup, since the user can merely mount the beacons in the desired physical locations, and the system automatically determines the floorplan layout and relative beacon positions based on beacon measurements.

The beacons can share the information received during scanning (scanning information; e.g., beacon identifiers, broadcast timestamps, receipt timestamps) through: a mesh network formed by the beacons; the management system, wherein the management system receives and tracks the beacon identifiers received by the scanning beacons (e.g., via a user device or application); or through any other suitable sharing system.

In one embodiment, a first beacon scans for packets broadcast by secondary beacons and records scanning information for each received packet (e.g., the packet broadcast time, the broadcasting beacon identifier, and the packet receipt time). The first beacon preferably switches to a higher-power protocol (e.g., BLE long range radio) when scanning, but can alternatively scan with the low-power protocol (e.g., BLE, UWB) used for broadcasting packets, or use any other suitable protocol. The first beacon can then switch to a lower-power protocol and broadcast its beacon identifier. All or a subset of the remainder of the beacons within the space or population (e.g., defined by the managing entity or account) repeat the process. For example, all beacons can be deemed to have performed the process when no new beacon identifiers are identified from the beacon population's collective scanning process. The scanning information from the scanning beacons can then be aggregated, wherein a virtual map can be automatically generated from the collective scanning information. In one example, automatically generating the virtual map can include determining the relative beacon distances between each beacon of the plurality from the scanning information, wherein the virtual map can be generated from the relative distances. The virtual map can additionally be generated from beacon sensor data (e.g., orientation data, such as accelerometer or gyroscope data; measured light emitted by secondary beacons, indicative of line-of-sight; magnetometer data, indicative of a wall beam; etc.), received signal characteristics (e.g., phase, strength, etc.), beacon identifiers, or any other suitable information. For example, the beacon sensor data can be used to determine whether the beacon is arranged on a wall (e.g., when a gravity vector is parallel a known mounting surface). In one example, this can be performed by operating the high-power or high-bandwidth radios of the beacon in a setup mode (e.g., scanning mode, master mode, etc.), wherein the system (e.g., beacon, application, management system) can determine the relative arrangement of the beacons based on the and/or any other suitable information.

The virtual map can be generated by iterating through different beacon arrangements until the measured relative distances match the virtual distances. Alternatively, the virtual map can be generated by using an optimization method. However, the virtual map can be otherwise determined (e.g., using an analysis module, such as one running a genetic algorithm). The beacons can additionally be automatically virtually located within the newly generated map, wherein the physical location associated with the virtual beacon location can be assigned to the beacon. However, the system and method can otherwise automatically map the beacons to the physical space.

In a specific example, each beacon of a set sequentially scans for and discovers other beacons within the scanning range and creates a graph of RSSI values (e.g., distance) to nearby beacons. The graph is retrieved from each beacon when the application (e.g., a user device running the application) connects to the beacon, wherein the graph is subsequently used to determine the physical space layout. For example, the graph(s) from one or more beacons can be used to determine the relative beacon positions within the space, and the physical barriers within the space (e.g., walls) determined from the beacon mounting points (e.g., as determined from the beacon sensor measurements). However, the physical layout can be otherwise determined.

4.7 Beacon Monitoring.

The method can optionally include automatically monitoring beacon performance based on the information, which functions to automatically identify anomalous events requiring managing entity attention or action. Examples of anomalous events can include: beacon displacement (e.g., falling off the wall), beacon removal (e.g., theft), missing beacons, low beacon SOC, beacon signal interference, or any other suitable anomalous event indicative of a change in or suboptimal beacon performance. Monitoring beacon performance can additionally or alternatively function to provide information about beacon performance degradation over time, ambient environment change over time, or any other suitable information. The beacon performance can be monitored based on the sensor measurements, beacon identifier requests (e.g., in aggregate, across multiple application instances or user devices, etc.), features extracted from beacon operation (e.g., new beacon identifier requests, new beacon sensor measurements, historic beacon identifier requests, historic beacon sensor measurements, etc.), or based on any other suitable information.

Figure 5:
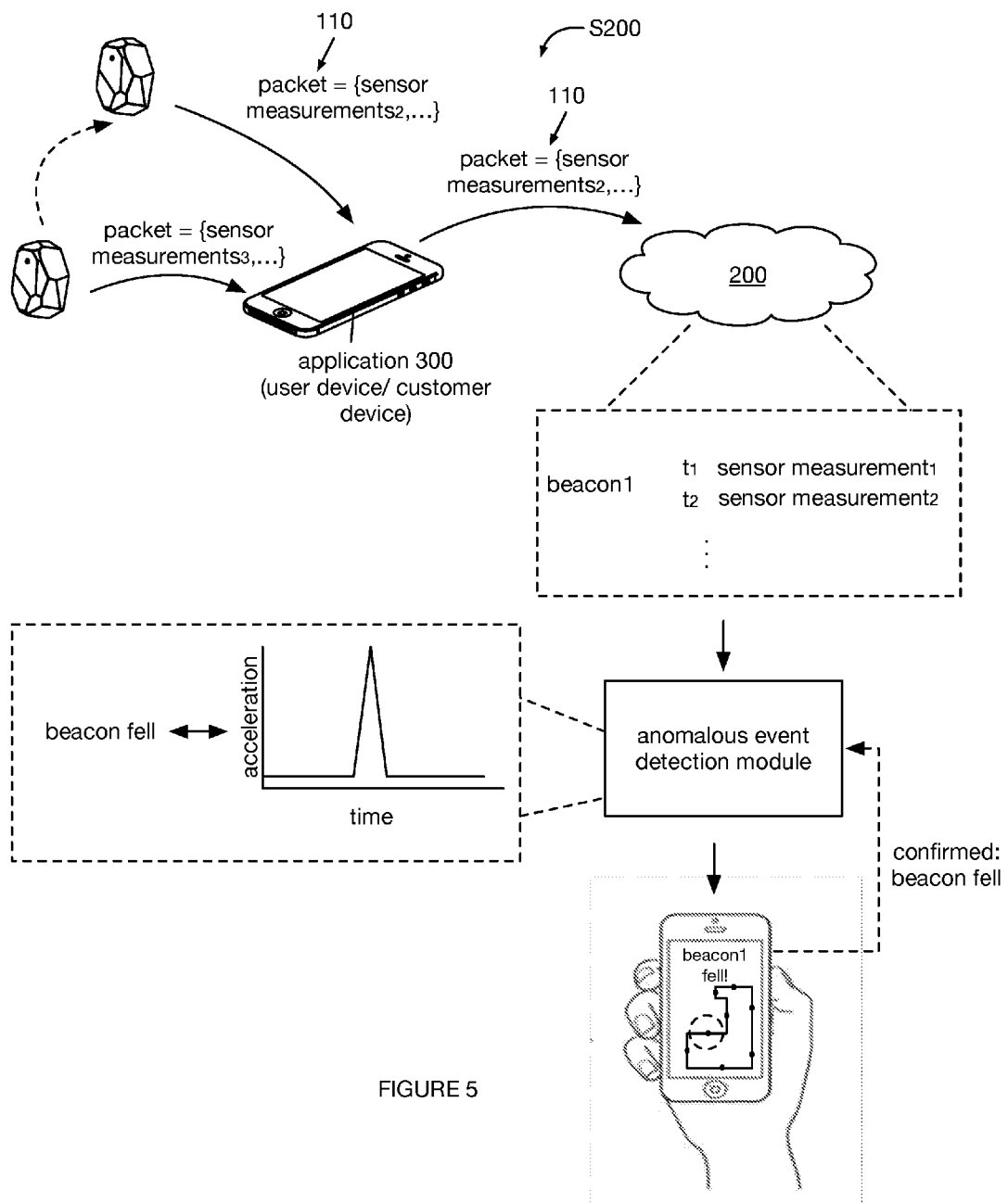
FIG. 5 is a schematic representation of a specific example of beacon monitoring.
Figure 6:
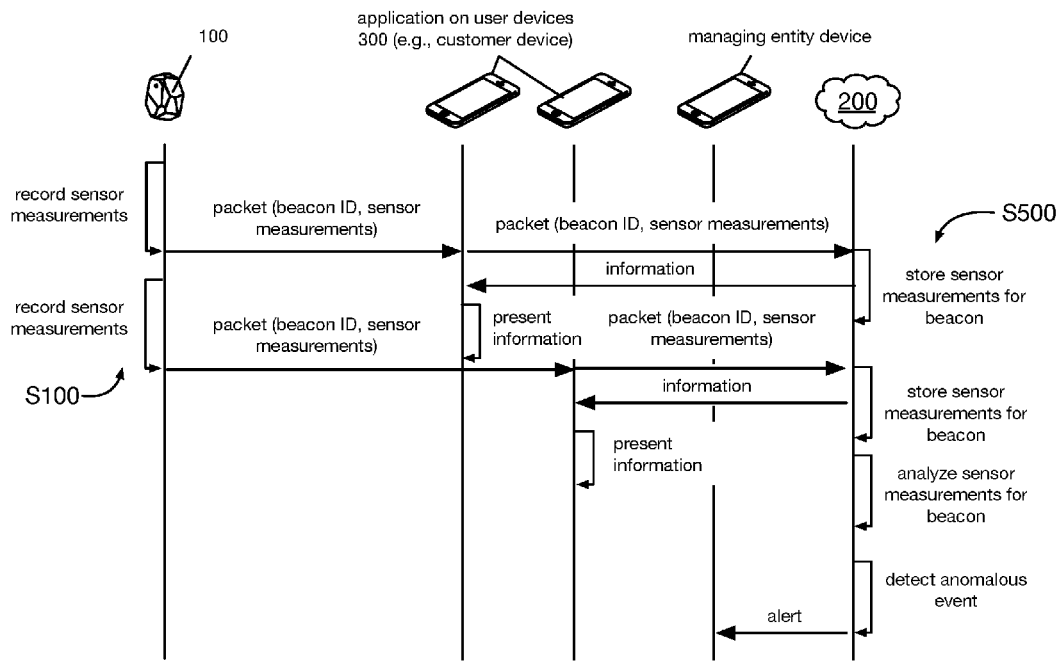
FIG. 6 is a schematic representation of a variation of beacon monitoring.

As shown in FIG. 6, monitoring beacon performance can include: automatically determining occurrence of a predetermined event based on the stored information (e.g., historic operation parameter values) and performing an action in response to predetermined event occurrence, example shown in FIG. 5. The anomalous event can additionally be stored in association with the beacon identifier in the management system, which can subsequently be used to identify harsh beacon operating environments, bad beacon batches, or used in any other suitable manner. However, the beacon performance can be otherwise monitored.

Automatically determining occurrence of a predetermined event based on the stored information functions to characterize beacon operation. The predetermined event can be anomalous beacon operation, be an ambient environment event, or be any other suitable event.

In a first variation, the anomalous event can be determined when the new sensor measurements deviate beyond a threshold difference from historic values. This analysis can consider measurements from one or more sensors. For example, a change in acceleration can be indicative of beacon movement (e.g., a fall). In a second example, low beacon SOC can be determined when the reported beacon voltage falls below a voltage threshold.

In a second variation, the anomalous event can be determined when a beacon trend substantially matches a predetermined pattern. For example, a sudden acceleration (e.g., from the accelerometer measurements) followed by a change in resting orientation (e.g., from the gyroscope measurements) can be indicative of a fall. In a second example, a sudden acceleration coupled with an increase in ambient temperature can be indicative of manual beacon removal (e.g., theft). In a third variation, a sudden drop on beacon identifier receipt frequency by application instances (e.g., user devices) known to be within the beacon's broadcasting range (e.g., based on receipt of identifiers for adjacent beacons, wherein the beacon is historically received within a threshold time duration of adjacent beacon identifier receipt) can be indicative of beacon failure or broadcast blockage.

In a third variation, the anomalous event is determined using a machine learning module (e.g., anomalous event determination module), based on features extracted from beacon operation (e.g., the beacon's telemetry data). In one embodiment, the anomalous event determination module includes a different module for each anomalous event. In this embodiment, the anomalous event determination module outputs a probability for each anomaly event, wherein the recommended anomaly event can be the one with the highest probability. For example, a first module can determine the probability that a beacon has fallen, while a second module can determine the probability that the beacon has crashed. In a second embodiment, the anomalous event determination module includes a series of modules that serially narrow the set possible anomalous events, wherein the anomalous event determination module outputs the recommended anomaly event. However, the anomalous event can be otherwise determined.

The analysis modules (e.g., anomalous event determination module) can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. The analysis module can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), a heuristic method (e.g., a genetic algorithm, an evolutionary algorithm, etc.), and/or any suitable form of algorithm. The analysis module can additionally or alternatively be a: probabilistic module, heuristic module, deterministic module, or be any other suitable module leveraging any other suitable computation method, machine learning method, or combination thereof.

The modules can be run or updated concurrently, serially, at varying frequencies, or at any other suitable time. The modules can be validated, verified, reinforced, calibrated, or otherwise updated based on newly received, up-to-date data; past data or be updated based on any other suitable data. The modules can be run or updated: periodically, in response to the user-specified event differing from the recommended event, or at any other suitable frequency.

Performing the action functions to treat the beacon anomaly as a trigger event, and can mitigate adverse effects arising from the detected event. The action can be performed by the management system, the application, an application instance, the beacon, or by any other suitable component. Examples of actions that can be taken include: automatically ordering a new beacon (e.g., upon occurrence of a certain anomalous event class), automatically determining and pushing new operation instructions for neighboring beacons (e.g., increasing the broadcast frequency or strength to accommodate for a non-operational beacon), sending an alert to a user account associated with the beacon, or include any other suitable action.

Sending an alert to a user account functions to notify the managing entity of the anomalous event. The alert can be automatically generated based on the determined anomalous event, based on managing entity preferences, or otherwise generated. The alert can be a notification, text message, message to a linked social networking system account, email, or be any other suitable alert. The alert can include a description of the anomalous event (e.g., "beacon fallen," "replace beacon," anomalous event class, etc.), a beacon identifier (e.g., a user-assigned beacon identifier, such as "kitchen beacon," visual beacon identifier, such as "blue beacon," beacon broadcast identifier, beacon static identifier, etc.), a beacon physical location (e.g., based on the location associated with the beacon in the management system, an estimated location based on beacon orientation sensor data, an estimated location based on locations of user devices that detected the beacon after the anomalous event, etc.), or include any other suitable information. The alert can be sent to the application, a managing entity account, a managing entity device, or any other suitable endpoint. The alert can be actionable (e.g., wherein a user can interact with the management system through the alert), or be unactionable (e.g., wherein the alert simply notifies the user of a problem).

The method can additionally include receiving an anomalous event confirmation, which functions to verify that the detected event occurred. This can additionally provide a supervised training set, which can be used to train the anomalous event detection module. For example, when the confirmation deviates from the determined anomalous event (e.g., "stolen" when the determined event was "fallen"), the management system can automatically calibrate the anomalous event detection module based on the underlying beacon operation data and the confirmation. When the confirmation substantially matches the determined anomalous event, the management system can automatically reinforce the anomalous event detection module based on the underlying beacon operation data and the confirmation. However, the anomalous event detection module can be otherwise trained on the confirmation.

The confirmation is preferably received from the managing entity, but can alternatively be received from any other suitable user. The confirmation can be received through the alert (e.g., through the notification), through subsequent managing entity action (e.g., rebooting the beacon, purchasing a new beacon, assigning a new beacon with the physical location previously associated with the beacon, etc.), or otherwise received. The confirmation can additionally be stored in the management system in association with the managing entity, which functions to log managing entity actions on the anomalous event. This log can be used by multiple sub-entities of the managing entity to avoid redundant actions on the anomalous event. This can additionally function to prevent false negatives, which can skew the supervised training set.

4.8 Remote Beacon Updating.

Figure 8:
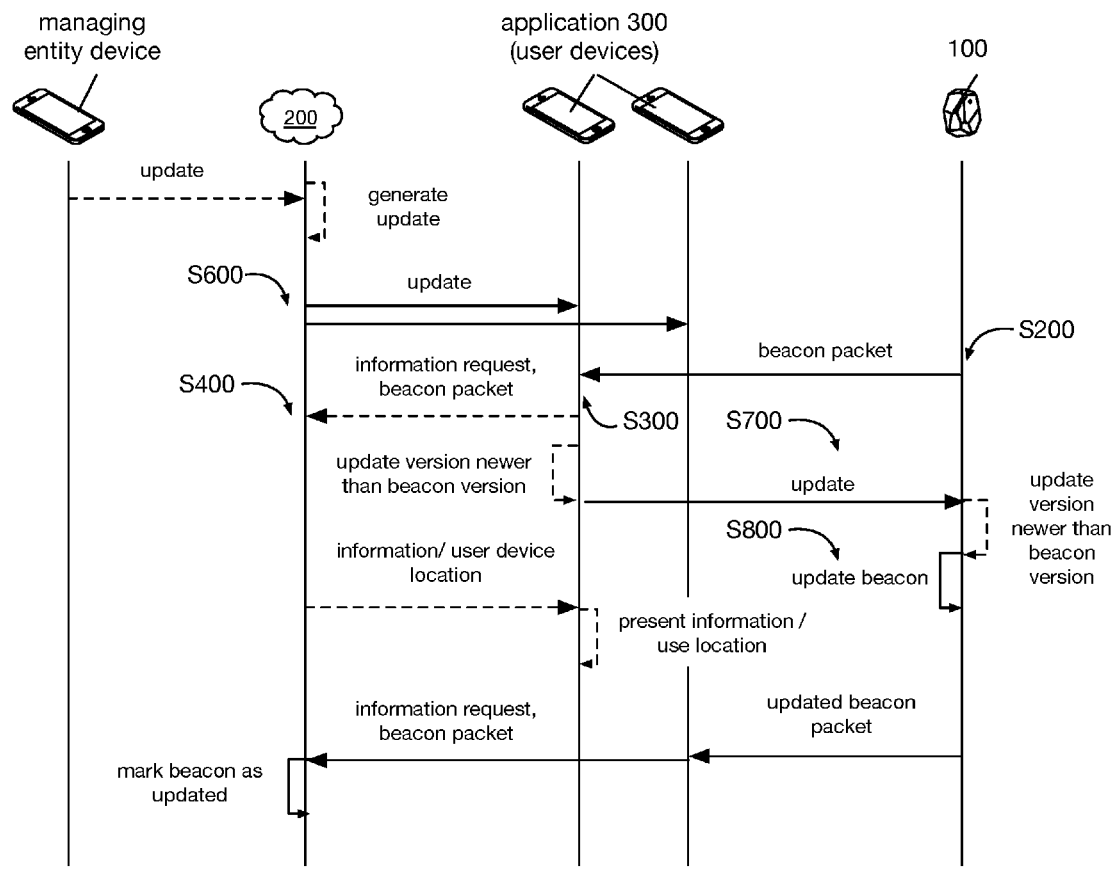
FIG. 8 is a schematic representation of a variation of beacon updating.

The method can optionally include remotely controlling the beacons, which functions to control beacon operation (e.g., set settings, update the beacon, etc.) without being physically proximal the beacon. As shown in FIG. 8, remotely controlling the beacons can include: determining an update for the beacon; sending the update to the application S600; in response to application connection with the beacon, sending the update from the application to the beacon S700; and automatically updating the beacon in response to receipt of the update S800. However, the beacon can be otherwise remotely controlled.

Figure 7:
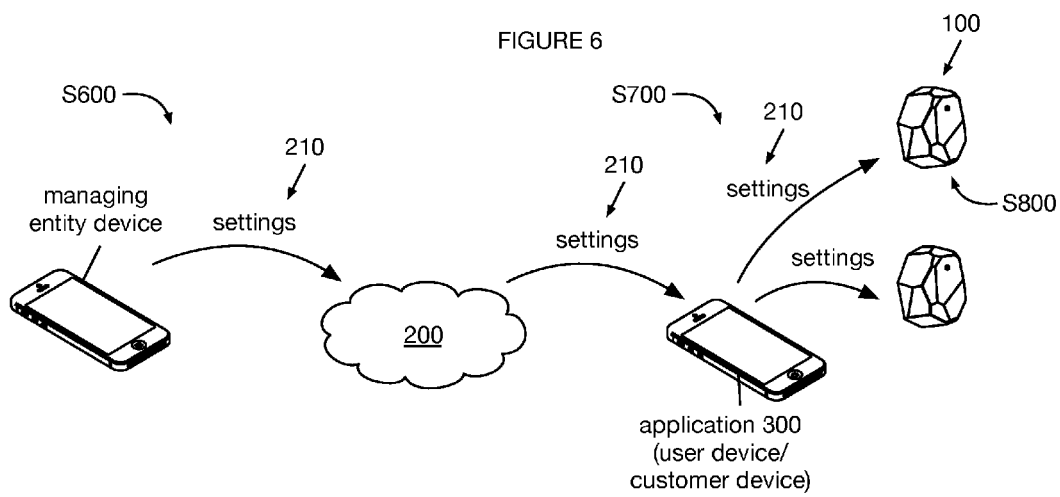
FIG. 7 is a schematic representation of a specific example of beacon updating.

In one example of remote beacon control (shown in FIG. 7), a software change (e.g., setting update, firmware upgrade, etc.) is received from the managing entity at the management system (e.g., through a RESTful API, a management interface, etc.). The management system transmits the update to the user devices running the application (e.g., running the SDK; as a beacon update notification, as an application update, etc.). Whenever a user device running the application enters the communication range of a designated beacon, the update can be sent to the beacon and applied at the beacon. The beacon can then be marked as updated (e.g., by the application, the management system, etc.).

Determining an update for the beacon S610 functions to receive new information for the beacon. The update can include: new firmware, new settings (e.g., operation schedules, broadcast identifier equations, content sent within the packet, etc.), new accounts associated with the beacon, or any other suitable information. The update can be received from the managing entity (e.g., through a management interface or application, from a management account, etc.), generated by a manufacturer, received from an advertising company, or otherwise determined. The update is preferably determined by the management system, but can alternatively be otherwise determined. The update can be determined for a single beacon of the set, for a subset of the set, for the entirety of the set, for beacons associated with multiple managing entities, or for any other suitable population of beacons. The update can be individually addressed to the beacons, globally addressed, or otherwise addressed. The update can be an update packet, including all information required to update the beacon; an update reference (e.g., an update link), wherein the application instance or beacon subsequently retrieves the update packet from the management system based on the update reference; or be any other suitable data structure. The beacon set to be updated can be associated with the management entity, associated with a beacon population (e.g., for a store or geofence), have identifiers on an update list, or be otherwise designated for updating Sending the update to the application S600 functions to transfer the new information to an intermediary, wherein the intermediary communicates the information to the beacon. In one variation, the update can be sent to all applications (e.g., to applications associated with multiple managing entities). In a second variation, the update can be sent to only the application associated with the managing entity. In a third variation, the update can be sent to instances of the application(s) running on user devices within a predetermined geographic region of the beacon. These user devices can be: user devices with geographic locations within a predetermined distance of the beacon location; user devices (or application instances) that have detected the beacon before; user devices (or application instances) associated with a user within a user demographic, wherein the demographic has a probability over a threshold probability of being physically proximal the beacon in the future; or be any other suitable user device. In a fourth variation, the update can be sent to instances of the application that have previously detected one or more of the beacons to be updated. In a fifth variation, the update can be sent to application instances requesting information associated with a beacon of the beacon population (e.g., sending the remote computing system the beacon identifier). However, the update can be sent to any other suitable set of applications or application instances.

In a first variation, sending the update to the application includes: pushing the update to the application, wherein the application pushes the update to the application instances executing on the user devices. Each user device stores the update until the respective application instance detects a beacon of the beacon population, wherein the update is sent to the beacon (e.g., retrieved by the beacon or pushed to the beacon) upon beacon detection.

In a second variation, sending the update to the application includes: detecting the beacon at an application instance; determining that the beacon is to be updated by the application instance (e.g., based on a list of beacons to be updated, wherein the list is received from the management system and stored by the respective user device); requesting the update from the management system (e.g., based on the beacon identifier), by the application instance, in response to determination that the beacon is to be updated; and sending the update to the beacon in response to receipt of the update from the management system.

In a third variation, sending the update to the application includes: detecting the beacon at an application instance; receiving the beacon packet at the management system from the application instance; in response to the update version (e.g., firmware version, setting version, etc.) differing from the current update version, sending the current update to the application instance from the management system (e.g., along with content associated with the beacon; in response to update receipt at the application instance, sending the update to the beacon). However, the update can be otherwise sent to the beacon.

When the updates are specific to individual beacons, the method can include individually applying the updates to the respective beacons. In one variation, this can include pushing all updates to a given beacon, wherein the beacon selects and applies the update addressed to itself. In a second variation, this can include receiving a broadcast beacon packet at the application instance or remote computing system, extracting a beacon identifier from the beacon packet, selecting the update for the beacon based on the beacon identifier, and transmitting the selected update to the beacon. However, individual updates for each beacon can be otherwise individually applied.

Automatically updating the beacon in response to receipt of the update S800 functions to overwrite or otherwise adjust the parameters used by the beacon to operate. The beacon preferably automatically controls the updating process in response to receipt of the update (or update link) at the beacon, but the application instance or any other suitable device can alternatively or additionally control beacon updating. In one variation, the beacon preferably receives the update packet, stores the update packet until a predetermined time (e.g., after operation hours, when traffic is low, when sensor data satisfies a predetermined condition, etc.), and updates its parameters based on the update packet. In a second variation, the beacon can immediately update itself in response to receipt of the update packet. However, the beacon be updated at any other suitable time.

The method can optionally include version control. Version control can be performed by the beacon, the application instance, the remote computing system, or by any other suitable system. For example, the beacon can apply any received update, only apply updates addressed to itself, only apply updates having a version number different (e.g., higher) than the current version number (e.g., operating beacon setting number), or control updating in any other suitable manner. In a second example, the application instance compares the beacon's current version (e.g., extracted from the beacon packet and/or retrieved from the beacon itself) with the update packet's version, and transmits the update packet to the beacon when the beacon's current version is older than the update packet's version (or satisfies another condition). In a third example, the remote computing system receives the beacon's current version from the application instance, compares the beacon's current version and update packet's version, and controls beacon updating when the beacon's current version is older than the update packet's version (e.g., instructs the application instance to transmit the update; sends the update for the beacon to the application instance for forwarding, etc.). However, the operation parameter version control can be otherwise achieved.

The method can optionally include tracking which beacons have been updated, which can function to minimize the beacon power expenditure wasted by updating the same beacon with the same update. This can additionally or alternatively function to identify which beacons need further updating action.

In a first variation, the beacon can track whether it has been updated. In this variation, the beacon can check the update version in response to update receipt, prior to automatic beacon updating. For example, the beacon can determine the update version (e.g., by reading the update packet, reading the update link, etc.), compare the received update version to the update version stored by the beacon, and initiate the update process in response to the stored update version differing from the received update version. However, the beacon can otherwise track its own update history.

In a second variation, the management system can track whether the beacon has been updated. In this variation, the management system can monitor the beacon packets received from application instances after the update has been sent to the application, wherein a beacon identifier is marked as updated in response to receipt of a beacon packet with the updated version number. Alternatively, the management system can mark the beacon identifier as updated when the beacon identifier is received from an application instance that has received the beacon update. The management system can additionally analyze the population of beacons associated with the managing entity, identify beacon identifiers that have not been updated, and send beacon information (e.g., beacon location, visual identifiers, etc.) associated with the identified beacon identifiers to the managing entity. Alternatively, the management system can decline to send the update packet to updated beacons in response to receipt of an update request from the updated beacon. However, the management system can otherwise control update release to the beacons.

In a third variation, the application can track whether the beacon has been updated, wherein the application tracks the beacons that the application instances (e.g., individual user devices) have connected to and pushed updates to. The application can additionally verify beacon update based on the beacon packets (e.g., update version in the packets) received by the application instances (e.g., same instances that pushed the update or different instances). However, the beacon update status can be tracked in any other suitable manner.

Taking further updating actions functions to update beacons that were not updated through the application intermediary. This can be performed in response to determination that a beacon within the designated set has not been updated within a predetermined time period. In one variation, taking further updating actions includes sending a notification to the managing entity to manually re-program the un-updated beacon. In a second variation, example shown in FIGURE ii, taking further updating actions includes controlling the beacons to form a mesh network, and passing updates through the mesh network to the un-updated nodes. In this variation, the beacon population can form a mesh, wherein the application sends the update instructions (e.g. to update the un-updated nodes) to a beacon within the beacon population when a user device running the application (e.g., an application instance) comes within the beacon's range. The beacon can receive the instruction and control the population of beacons to form a mesh network (e.g., immediately, at a predetermined time, etc.). The beacons can use a high-power protocol (e.g., BLE long range, Zigbee, UWB, etc.) to form the mesh, use a low-power protocol to form the mesh, or use any other suitable protocol. However, the beacon population can be otherwise controlled to form a mesh network. However, any other suitable action can be taken.

The second variation can optionally include configuring the mesh. In a specific example, configuring the mesh includes: operating a beacon's radio in a scanning mode (e.g., master mode, server mode), scanning for neighboring beacons (e.g., scanning for and/or receiving beacon packets broadcast by neighboring beacons operating in a scanning or broadcast mode), and storing the neighboring beacons' identifiers in association with the receiving beacon (e.g., stored on-board the receiving beacon, in a remote system in association with the receiving beacon's identifier). This can be performed for every beacon in the population, a subset of beacons (e.g., until identifiers all beacons in the population are associated with at least one other beacon in the population), or for any suitable number of beacons. The mesh can be formed using the beacon's high-bandwidth, short-range radio (e.g., UWB); low-bandwidth, short-range radio (e.g., BLE), or any other suitable radio. The mesh can be formed automatically (e.g., upon installation), in response to occurrence of a mesh formation event (e.g., formation command receipt, etc.), or at any other suitable time.

In a specific variation, forming the mesh can include: operating a beacon as a slave or client mode (e.g., wherein the beacon does not scan/listen for other devices and just broadcast the beacon's information); in response to detection of an updating event, operating the beacon in a master or server mode (e.g., wherein the beacon can discover and connect to other BLE devices, such as other beacons; wherein the beacon automatically connects to the neighboring beacons based on the stored identifiers; etc.); connecting to other auxiliary beacons in the master/client mode; transmitting data from the beacon to the auxiliary beacons over the resultant connection; and optionally operating the beacon in the slave or client mode after data transmission. Data can be communicated through the mesh using the radio used to form the mesh or using a different radio (e.g., having different or similar range). Transmitting the data (e.g., update) through the mesh can optionally include verifying update receipt, such as by receiving a verification from the auxiliary beacon, receiving an update version number (e.g., firmware version) for the beacon through subsequent beacon interactions (e.g., with application instances subsequently receiving packets broadcast by the beacon) at a monitoring system (e.g., the remote computing system, application, etc.), or otherwise verifying update receipt.

The updating event can be: updated setting application to the beacon; a predetermined time being met; GPIO readings satisfying a predetermined value, frequency, or other parameter; or any other suitable event. The transmitted data can include settings (e.g., the updated settings applied to the beacon), firmware, or any other suitable information. Furthermore, because the physical location of every beacon is known and stored in the remote computing system, the information can be used to build intelligent data routes—how to relay data from one beacon to another. This increase the data routing efficiency (and/or power or resource usage) over conventional flooded architectures. Alternatively, the beacons can cooperatively form a fully functional, real-time mesh (e.g., using WiFi, Zigbee, BLE, UWB etc.) and communicate information through the mesh.

An alternative embodiment preferably implements the above methods in a computer-readable medium storing computer-readable instructions. The instructions are preferably executed by computer-executable components preferably integrated with a beacon management system. The beacon management system can include a set of beacons associated with a managing entity, an application (e.g., associated with the managing entity or with a second managing entity), and a management system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for distributed beacon management, comprising:
   at a remote management system:
      receiving beacon settings from a management account with access permissions to a beacon population;
      transmitting the beacon settings for the beacon population to a plurality of application instances, each application instance executing on a separate and distinct user device;
   receiving a beacon packet, broadcast by a beacon of the beacon population, at an application instance of the plurality;
   in response to beacon packet receipt, at the application instance:
      transmitting the beacon settings from the respective user device to the beacon;
      transmitting beacon telemetry, extracted from the beacon packet, to the remote management system; and
      determining a location for the respective user device based on a predetermined beacon location for the beacon, wherein the predetermined beacon location is associated with a beacon identifier determined from the beacon packet;
   at the remote management system:
      receiving beacon telemetry for the beacon from the plurality of application instances;
      storing the beacon telemetry from the plurality of application instances at the remote management system in association with the beacon identifier;
      monitoring the stored beacon telemetry for occurrence of a predetermined event; and
      in response to occurrence of the predetermined event:
         generating a notification comprising identifying information for the beacon; and
         transmitting a notification associated with an anomaly classification for the predetermined event to a management client associated with the beacon.

2. The method of claim 1, wherein the beacon telemetry comprises sensor data measured by sensors on-board the beacon.

3. The method of claim 1, further comprising transmitting the beacon identifier from the application instance to the remote management system, wherein the beacon settings are transmitted to the application instance by the remote management system after receiving the beacon identifier from the application instance.

4. The method of claim 1, further comprising: determining an operating setting version number from the beacon packet; and transmitting the beacon settings to the beacons in response to the operating setting version number differing from a current setting version number for the beacon settings.

5. The method of claim 1, further comprising:
   automatically connecting beacons of the population into a mesh;
   receiving the beacon settings at the beacon from the application instance; and
   transmitting the beacon settings from the beacon to remaining beacons of the population through the mesh.

6. The method of claim 5, wherein transmitting the beacon settings from the beacon to the remaining beacons within the population through the mesh comprises:
   operating the beacon in a server mode while operating the remaining beacons in a client mode;

connecting the beacon to the remaining beacons proximal the beacon;
transmitting the beacon settings from the beacon to the remaining beacons proximal the beacon; and
operating the beacon in the client mode after beacon setting transmission.

7. The method of claim 6, wherein automatically connecting beacons of the population into a mesh comprises:
a) operating a radio of a first beacon within the population in a scanning mode;
b) with the radio operating in the scanning mode, receiving beacon packets broadcast by the remaining beacons within the population; and
c) storing beacon identifiers determined from the received beacon packets at the first beacon; and
d) repeating a)-c) for each beacon within the set.

8. A method for distributed beacon management, comprising:
at a remote management system, receiving beacon settings from a management account with access permissions to a beacon population;
from the remote management system, transmitting the beacon settings to a plurality of application instances, each application instance executing on a separate and distinct user device;
receiving a beacon packet broadcast by a beacon at each of the plurality of application instances;
at each application instance, transmitting beacon telemetry, extracted from the beacon packet, from the application instance to a remote management system in response to beacon packet receipt;
at the remote management system:
receiving the beacon telemetry for the beacon from the plurality of application instances;
storing the beacon telemetry received from the plurality of application instances in association with a beacon identifier for the beacon;
monitoring the stored beacon telemetry for occurrence of a predetermined event; and
in response to occurrence of the predetermined event, generating a notification comprising identifying information for the beacon; and
transmitting a notification associated with the anomaly classification to a management client associated with the beacon; and
determining a location for the respective user device executing the application instance based on a beacon location associated with the beacon.

9. The method of claim 8, further comprising:
transmitting the beacon settings from an application instance of the plurality to the beacon in response to receipt of the beacon packet; and.

10. The method of claim 9, further comprising:
automatically connecting the beacon to a secondary beacon to form a mesh;
receiving the beacon settings at the beacon from the application instance; and
transmitting the beacon settings from the beacon to secondary beacon through the mesh.

11. The method of claim 8, wherein the predetermined event comprises an occurrence of a beacon operation anomaly, wherein performing the action comprises:
generating a notification comprising identifying information for the beacon; and
transmitting a notification associated with the anomaly classification to a management client associated with the beacon.

12. The method of claim 11, wherein the beacon telemetry comprises sensor data measured by sensors on-board the beacon.

13. The method of claim 12, wherein the sensor data comprises beacon orientation data measured by an orientation sensor on-board the beacon, wherein the beacon operation anomaly comprises an orientation data pattern indicative of beacon movement.

14. A method for beacon fleet management, comprising:
a) receiving the beacon settings from a management account with access permissions to the beacon population at the remote management system;
b) transmitting beacon settings for a beacon population to a plurality of application instances from the remote management system, each application instance executing on a separate and distinct user device;
c) receiving a beacon packet, broadcast by a beacon of the beacon population, at an application instance of the plurality;
d) in response to beacon packet receipt, at the application instance;
transmitting the beacon settings from the respective user device to the beacon; and
transmitting beacon telemetry, extracted from the beacon packet, from the application instance to a remote management system; and
e) monitoring the beacon telemetry for occurrence of a predetermined event; and
f) in response to occurrence of the predetermined event, generating a notification comprising identifying information for the beacon; and transmitting a notification associated with the anomaly classification for the predetermined event to a management client associated with the beacon;
g) determining a location for the respective user device based on a predetermined beacon location for the beacon, wherein the predetermined beacon location is associated with a beacon identifier determined from the beacon packet;
h) repeating c) to g) for each beacon of the beacon population.

15. The method of claim 14, wherein the beacon comprises a short-range radio, wherein the beacon packet is broadcast by the short-range radio.

16. The method of claim 14, wherein d) further comprises: determining an operating setting version number from the beacon packet; and transmitting the beacon settings to the beacons in response to the operating setting version number differing from a current setting version number for the beacon settings.

* * * * *